(12) United States Patent
Zou et al.

(10) Patent No.: US 12,056,228 B2
(45) Date of Patent: Aug. 6, 2024

(54) MODEM/GATEWAY DEVICE HAVING A WIRELESS NETWORK PASSWORD RETRIEVAL FUNCTION

(71) Applicant: ARRIS Enterprises LLC, Suwanee, GA (US)

(72) Inventors: Shixi Zou, Guangdong (CN); Yang Zhao, Guangdong (CN); Dongting Zhang, Guangdong (CN); Huajian Liu, Guangdong (CN); Wei Lu, Guangdong (CN)

(73) Assignee: RUCKUS IP HOLDINGS LLC, Claremont, NC (US)

( * ) Notice: Subject to any disclaimer, the term of this patent is extended or adjusted under 35 U.S.C. 154(b) by 443 days.

(21) Appl. No.: 17/295,169

(22) PCT Filed: May 19, 2020

(86) PCT No.: PCT/CN2020/091085
§ 371 (c)(1),
(2) Date: May 19, 2021

(87) PCT Pub. No.: WO2021/232246
PCT Pub. Date: Nov. 25, 2021

(65) Prior Publication Data
US 2022/0309147 A1 Sep. 29, 2022

(51) Int. Cl.
*G06F 21/45* (2013.01)
(52) U.S. Cl.
CPC ...... *G06F 21/45* (2013.01); *G06F 2221/2131* (2013.01)

(58) Field of Classification Search
CPC .................. G06F 21/45; G06F 2221/2131
See application file for complete search history.

(56) References Cited

U.S. PATENT DOCUMENTS 10,055,747 B1 * 8/2018 Sherman ............. G06F 21/6245
2015/0312249 A1 10/2015 Lau et al.
(Continued)

FOREIGN PATENT DOCUMENTS

CN 103246841 8/2013
CN 104919440 A * 9/2015 ........... G06Q 10/107
(Continued)

OTHER PUBLICATIONS

Li, CN105656907 Router Management Password Recovery Method and System, 2016, WIPO Machine Translation. (Year: 2016).*
(Continued)

*Primary Examiner* — Michael R Vaughan
(74) *Attorney, Agent, or Firm* — Wenderoth, Lind & Ponack, L.L.P.

(57) ABSTRACT

A modem/gateway device having a password retrieval function is provided that includes a user interface, a hardware processor, and a non-transitory memory configured to store one or more programs. The hardware processor executes the one or more programs to receive a request for a password retrieval in response to an input from the user interface, generate a message for retrieving a password for a wireless network, and transmit the message to a server. The password corresponds to an email address to which an email is to be sent by the server. The transmitted message instructs a password retrieval operation by the server to transmit the password to the email address.

17 Claims, 4 Drawing Sheets

(56) References Cited

U.S. PATENT DOCUMENTS

2016/0373258 A1* 12/2016 Bone .................... G06F 21/575
2019/0245688 A1*  8/2019 Patin ....................... H04L 9/321
2020/0110866 A1*  4/2020 Greenberger ........... G06F 21/36
2022/0158837 A1*  5/2022 Ganapathy ............ H04L 9/3228

FOREIGN PATENT DOCUMENTS

| CN | 105656907 |   | 6/2016 |
| CN | 106412960 |   | 2/2017 |
| CN | 106529403 A | * | 3/2017 |

OTHER PUBLICATIONS

International Search Report and the Written Opinion of the International Searching Authority dated Feb. 19, 2021 in International (PCT) Application No. PCT/CN2020/091085.

* cited by examiner

MODEM/GATEWAY DEVICE HAVING A WIRELESS NETWORK PASSWORD RETRIEVAL FUNCTION

TECHNICAL FIELD

The subject matter of the present disclosure relates generally to a modem/gateway device having a wireless network password retrieval function.

BACKGROUND

Wireless networks for providing services to client devices or end devices via a modem/gateway device are prevalent in many homes and businesses. Typically, wireless networks are password protected to provide security against cyber-attacks in which sensitive data may be stolen.

When initially configuring a wireless network, homeowners establish a password for accessing the network. However, sometimes there is problem remembering the password, for example, when attempting to connect a guest's device to the network or attempting to connect a new device of the homeowner to the network.

Retrieving the password of a wireless network typically requires users to log into the network modem's local area network (LAN) graphical user interface (GUI) via an Ethernet client or a client connected to the network. However, the LAN GUI is typically password protected and sometimes there are problems remembering the LAN GUI password. When both the wireless network password and the LAN GUI passwords are forgotten, the only way to gain access to the wireless network is to restore the modem to the default settings, which results in the loss of all previous configurations.

Therefore, known techniques for obtaining a forgotten wireless network password have drawbacks. Resetting the modem to its default settings requires reconfiguring the network, which can be inconvenient, time consuming, embarrassing, and costly.

Thus, it would be advantageous and an improvement over the relevant technology to provide an apparatus, system, method, and computer-readable recording medium capable of quickly and conveniently retrieving a password for accessing a wireless network without the need to reset the modem to its default settings.

SUMMARY

An aspect of the present disclosure provides a modem/gateway device having a wireless network password retrieval function. The modem/gateway device includes a user interface, a hardware processor, and a non-transitory memory configured to store one or more programs. The hardware processor executes the one or more programs to receive a request for a password retrieval in response to an input from the user interface, generate a message for retrieving a password for a wireless network, and transmit the message to a server. The password corresponds to an email address to which an email is to be sent by the server. The transmitted message instructs a password retrieval operation by the server to transmit the password to the email address.

In an aspect of the present disclosure the modem/gateway device user interface includes a button. The button may be a physical button. The password retrieval operation is activated in response to pressing the button using a predetermined sequence. The predetermined sequence includes pressing the button repeatedly in quick succession or pressing the button continuously for a predetermined period of time.

In another aspect of the present disclosure the hardware processor executes the one or more programs to generate a message including the password and the email address, encrypt the message including the password and the email address, and transmit the encrypted message to the server for storage therein of the password and the email address.

An aspect of the present disclosure provides a method for implementing a password retrieval function including receiving, using a modem/gateway device, a request for a password retrieval in response to an input from a user interface of the modem/gateway device. Moreover, the method includes generating, using the modem/gateway device, a message for retrieving a password for a wireless network and transmitting the message over a network to a server. The password corresponds to an email address to which an email is to be sent by a server. The transmitted message instructs a password retrieval operation by the server to transmit the password to the email address.

In another aspect of the present disclosure the method includes generating, using the modem/gateway device, a message including the password and the email address, encrypting the message including the password and the email address, and transmitting the encrypted message to the server. The server stores the password and the email address.

An aspect of the present disclosure provides a non-transitory computer-readable recording medium in a modem/gateway device for implementing a password retrieval function. The non-transitory computer-readable recording medium stores one or more programs which when executed by a hardware processor performs the steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are merely used to enable a clear and consistent understanding of the present disclosure. Accordingly, it should be apparent to those skilled in the art that the following description of the present disclosure is provided for illustration purposes only, and not for the purpose of limiting the present disclosure as defined by the appended claims and their equivalents.

Figure 1:
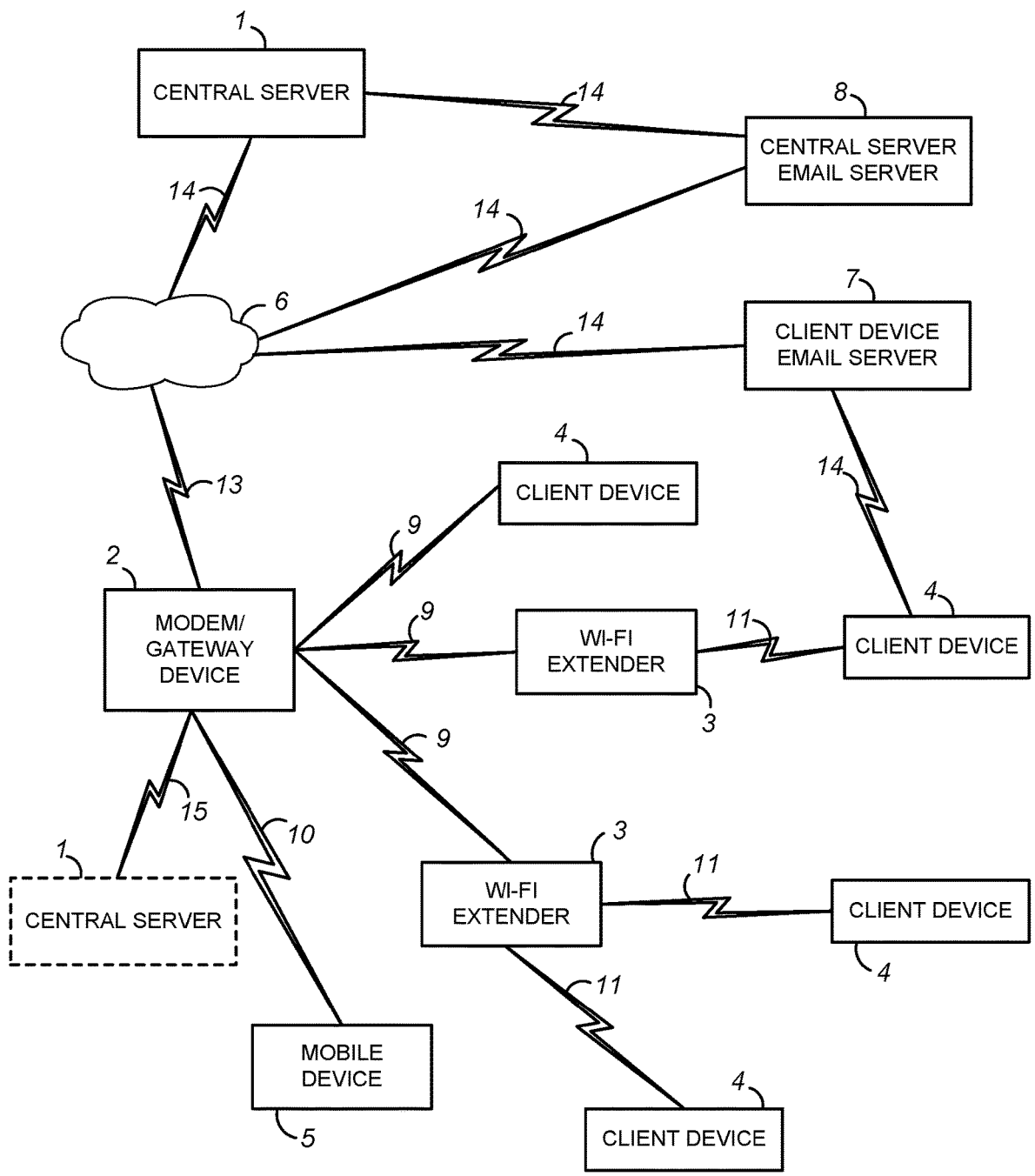
FIG. 1 is a schematic diagram illustrating an exemplary system for retrieving a password for accessing a wireless network according to an embodiment of the present disclosure.

FIG. 1 is a schematic diagram of an exemplary system for retrieving a password for accessing a wireless network according to an embodiment of the present disclosure. As shown in FIG. 1, the main elements of the system include a modem/gateway device 2 connected to a central server 1 via the Internet 6 and also connected to different wireless devices such as client devices 4 and wireless extenders 3. As shown in FIG. 1, the central server 1 is located on a content provider-side of the modem/gateway device 2. However, it is contemplated by the present disclosure that the central server 1 may alternatively be located on the content receiver-side of the modem/gateway device 2 (e.g., as indicated by the dotted or dashed lines).

When the central server 1 is located on the content receiver-side, the modem/gateway device 2 is not connected to the central server 1 via the Internet 6. Rather, the modem/gateway device 2 is connected to the central server 1 by connection 15. Additionally, the modem/gateway device 2 is connected to a mobile device 5. As shown in FIG. 1, the system also include a client device (CD) email server 7 and a central server (CS) email server 8 that may be connected to each other and the central server 1 via the Internet 6.

The system shown in FIG. 1 includes wireless devices (e.g., extenders 3, client devices 4, and mobile device 5) that may be connected in one or more wireless networks (e.g., private, guest, iControl, backhaul network, or Internet of things (IoT) networks) within the system. Additionally, there could be some overlap between devices in the different networks. That is, one or more network devices could be located in more than one network. For example, wireless extenders 3 could be located both in a private network for providing content and information to a client device and also included in a backhaul network.

Starting from the top of FIG. 1, the central server 1 may be any type of server or computer implemented as a network server or network computer for providing various shared resources to other computing devices connected to the network via the Internet 6. The connection 14 between the Internet 6 and the central server 1, between the central server 1 and the CS email server 8, and between the CS email server 8 and the Internet can be implemented using a wide area network (WAN), a virtual private network (VPN), metropolitan area networks (MANs), system area networks (SANs), a fiber optics network (such as FTTH (fiber to the home), FTTX (fiber to the x), or HFC (hybrid fiber-coaxial)), a public switched data network (PSDN), a global Telex network, or a 2G, 3G, 4G or 5G network, for example.

The CS email server 8 may be any type of server or computer implemented as a network server or network computer that is capable of running Mail Transfer Agent (MTA) software in accordance with Simple Mail Transfer Protocol (SMTP) to enable receiving, transmitting and storing email messages. The CS email server 8 may also provide various shared resources to other devices connected to the network via the Internet 6. Similarly, the CD email server 7 may be any type of server or computer implemented as a network server or network computer that is capable of running MTA software in accordance with SMTP to enable receiving, transmitting and storing email messages. The CD email server 7 may also provide various shared resources to other computing devices connected to the network via the Internet 6.

The connection 14 between the CD email server 7 and the Internet 6 as well as between the CD email server 7 and the client devices 4 can be implemented using a WAN a VPN, MANs, SANs, a fiber optics network (such as FTTH, FTTX, or HFC), PSDN, a global Telex network, or a 2G. 3G, 4G or 5G network, for example. FIG. 1 shows a connection 14 between the CD email server 7 and a single client device 4. However, it is contemplated by the present disclosure that the CD email server 7 can also be connected to the other client devices 4 and the mobile device 5 shown in FIG. 1 via the connection 14.

The modem/gateway device 2 is a hardware electronic device that performs the function of a stand-alone cable modem or a combination modem and gateway device that combines the functions of a modem, access point, and/or a router for providing received content to network devices (e.g., client devices 4, wireless extenders 3, and mobile device 5) in the system. It is also contemplated by the present disclosure that the modem/gateway device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The modem/gateway device 2 is connected to the Internet 6 via connection 13, connected to wireless extenders 3 and client devices 4 via connection 9, and connected to the mobile device 5 via connection 10. The modem/gateway device 2 can also be connected to the central server 1 (e.g., in the alternative location) via the connection 15.

The connection 13 between the modem/gateway device 2 and the Internet 6 can be implemented using a digital subscriber line (DSL), a coaxial cable connection, a broadband mobile phone network connection, an optical network connection, or other similar connections. For example, the connection 13 can be implemented using a fixed wireless connection that operates in accordance with, but is not limited to, 3rd Generation Partnership Project (3GPP) Long Term Evolution (LTE) or 5G protocols. It is also contemplated by the present disclosure that connection 13 is capable of providing connections between the modem/gateway device 2 and a WAN, a LAN, a VPN, MANs, PANs, WLANs, SANs, a DOCSIS network, a fiber optics network (FTTH, FTTX, or HFC), a PSDN, a global Telex network, or a 2G, 3G, 4G or 5G network, for example.

The connection 9 between the modem/gateway device 2 and the wireless extenders 3 and client devices 4 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands. Additionally, the connection 9 can be implemented using a wireless connection that operates in accordance with, but is not limited to, IEEE 802.11 protocol, RF4CE protocol, ZigBee protocol, Z-Wave protocol, or IEEE 802.15.4 protocol. It is also contemplated by the present disclosure that the connections 9 can include connections to a media over coax (MoCA) network. One or more of the connections 9 can also be a wired Ethernet connection.

The connection 10 between the modem/gateway device 2 and the mobile device 5 may be implemented through a wireless connection that operates in accordance with, but is not limited to, IEEE 802.11 protocol. The connection 10 may also be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as a CBRS band, 2.4 GHz bands, 5 GHz bands, or 6 GHz bands. The connection 10 between the modem/gateway device 2 and the mobile device 5 may also be implemented through a WAN, a LAN, a VPN, MANs, PANs, WLANs, SANs, a DOCSIS network, a fiber optics network (such as FTTH, FTTX, or HFC), a PSDN, a global Telex network, or a 2G, 3G. 4G or 5G network, for example. One or more of the connections 10 can also be a wired Ethernet connection.

The connection 15 between the modem/gateway device 2 and the central server 1 in the alternative location may be implemented through a wireless connection that operates in accordance with, but is not limited to, IEEE 802.11 protocol. The connection 15 may also be implemented using a wireless connection in accordance any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as a CBRS band, 2.4 GHz bands, 5 GHz bands, or 6 GHz bands. Additionally, the connection 15 between the modem/gateway device 2 and the central server 1 in the alternative location may be implemented through a WAN, a LAN, a VPN, MANs, PANs, WLANs, SANs, a DOCSIS network, a fiber optics network (such as FTTH, FTTX, or HFC), a PSDN, a global Telex network, or a 2G, 3G, 4G or 5G network, for example. One or more of the connection 15 can also be a wired Ethernet connection.

The wireless extenders 3 are hardware electronic devices such as access points used to extend the wireless network by receiving the signals transmitted by the modem/gateway device 2 and rebroadcasting the signals to client devices 4, which may be out of range of the modem/gateway device 2. The wireless extenders 3 can also receive signals from the client devices 4 and rebroadcast the signals via a connection 11 to the modem/gateway device 2, mobile device 5, or other client devices 4.

The connection 11 between the wireless extenders 3 and the client devices 4 may be implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. Additionally, the connection 11 may be implemented using a wireless connection that operates in accordance with, but is not limited to, IEEE 802.11 protocol, RF4CE protocol, ZigBee protocol, Z-Wave protocol, or IEEE 802.15.4 protocol.

The client devices 4 can be, for example, a hand-held computing device, a personal computer, an electronic tablet, a smart phone, smart speakers, an IoT device, an iControl device, or other similar wireless hand-held consumer electronic device capable of executing and displaying the content received through, for example, the modem/gateway device 2.

The mobile device 5 can be, for example, a hand-held computing device, a personal computer, a smartphone, an electronic tablet, an e-reader, a personal digital assistant (PDA), or a portable music player with smart capabilities that is capable of connecting to the Internet, cellular networks, and interconnect with other devices via Wi-Fi and Bluetooth protocols.

Figure 2:
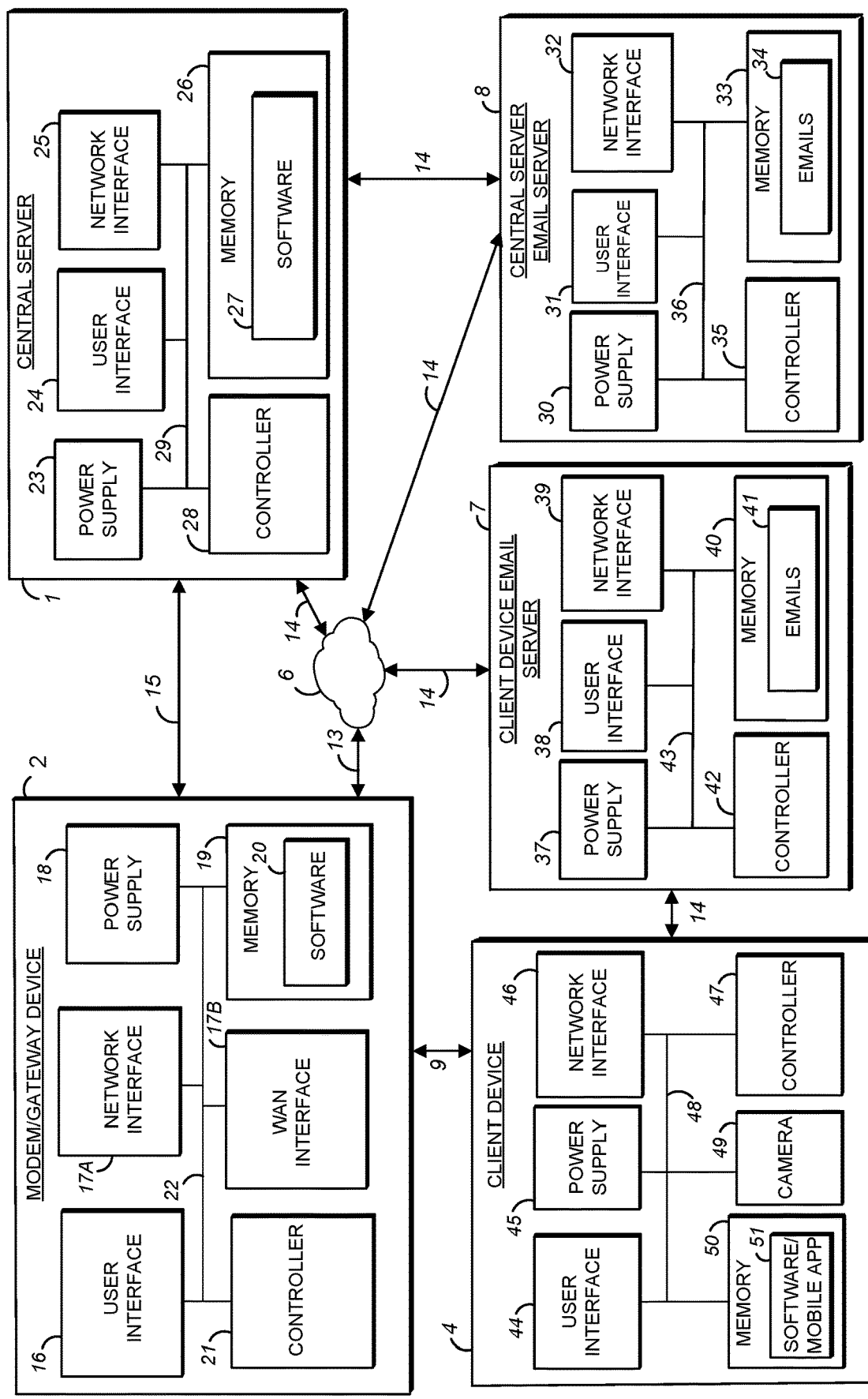
FIG. 2 is a more detailed schematic diagram illustrating an exemplary modem/gateway device, an exemplary central server, an exemplary email server for the central server, an exemplary email server for a client device, and an exemplary client device in the system of FIG. 1.

A detailed description of the example internal components of the central server 1, the modem/gateway device 2, the CS email server 8, the CD email server 7, and the client devices 4 shown in FIG. 1 will be provided in the discussion of FIG. 2. However, in general, it is contemplated by the present disclosure that the central server 1, modem/gateway device 2, the CS email server 8, the CD email server 7, and the client devices 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing devices in the central server 1, the modem/gateway device 2, the CS email server 8, the CD email server 7, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The central server 1, the modem/gateway device 2, the CS email server 8, the CD email server 7, and the client devices 4 are further equipped with components to facilitate communication with other computing devices over the one or more network connections to local and wide area networks, wireless and wired networks, public and private networks, and any other communication network enabling communication in the system.

FIG. 2 illustrates a more detailed schematic diagram of an example modem/gateway device 2, an example central server 1, an example CS email server 8, an example CD email server 7, and an example client device 4 in the system for retrieving a password for accessing a wireless network according to an embodiment of the present disclosure. Although FIG. 2 shows one client device 4, the client device 4 in the figure is meant to be representative of the other client devices 4 shown in FIG. 1.

The modem/gateway device 2 is a hardware electronic device that performs the function of a stand-alone cable modem or a combination modem and gateway device that combines the functions of a modem, access point and/or a router for providing received content to network devices (e.g., client devices, wireless extenders, and mobile device) in the system. It is also contemplated by the present disclosure that the modem/gateway device 2 can include the function of, but is not limited to, an IP/QAM STB or SMD that is capable of decoding audio/video content, and playing OTT or MSO provided content. As shown in FIG. 2, the modem/gateway apparatus 2 includes a user interface 16, a network interface 17A, WAN interface 17B, a power supply 18, a memory 19, and a controller 21.

The user interface 16 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the modem/gateway device 2.

The network interface 17A includes various network cards, and circuitry implemented in software and/or hardware to enable communications using the communication protocols of connections 9 and 15 (e.g., as previously described with reference to FIG. 1). Additionally, the WAN interface 17B may include various network cards, and circuitry implemented in software and/or hardware to enable communications between the gateway device 2 and the Internet 6 using the communication protocols in accordance with connection 13 (e.g., as described with reference to FIG. 1).

The power supply 18 supplies power to the internal components of the gateway/access point apparatus 2 through the internal bus 22. The power supply 18 can be a self-contained power source such as a battery pack with an interface to be powered through an electrical charger connected to an outlet (e.g., either directly or by way of another device). The power supply 18 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The memory 19 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 19 can be used to store any type of data and any type of instructions including software 20 associated with algorithms, processes, or operations related to retrieving a password for accessing a wireless network and for controlling the general functions and operations of the modem/gateway device 2.

It is contemplated by the present disclosure that during initial configuration of the wireless network, the user may be given the option of entering his or her email address and corresponding password in response to a prompt displayed by the user interface 16. Email addresses and corresponding passwords may also be entered via the user interface 16 during any configuration, modification, or reconfiguration of the wireless network. It is also contemplated by the present disclosure that updated email addresses and/or corresponding passwords may also be entered via the user interface 16.

The controller 21 controls the general operations of the modem/gateway device 2 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the modem/gateway device 2. Communication between the components (e.g., 16-19 and 21) of the modem/gateway device 2 is established using the internal bus 22.

The central server 1 may be any type of server or computer implemented as a network server or network computer for providing various shared resources to other computing devices connected to the network via the Internet 6. As shown in FIG. 2, the central server 1 includes a power supply 23, a user interface 24, a network interface 25, a memory 26, and a controller 28.

The power supply 23 supplies power to the internal components of the central server 1 through the internal bus 29. The power supply 23 can be a self-contained power source such as a battery pack with an interface to be powered through an electrical charger connected to an outlet (e.g., either directly or by way of another device). The power supply 23 can also include a rechargeable battery that can be detached allowing for replacement such as a NiCd, a NiMH, a Li-ion, or a Li-pol battery.

The user interface 24 includes, but is not limited to, push buttons, a keyboard, a keypad, an LCD, a TFT, an LED, an HD or other similar display device including a display device having touch screen capabilities so as to allow interaction between a user and the central server 1. The network interface 25 includes various network cards, and circuitry implemented in software and/or hardware to enable communications using the wireless protocols of connections 14 and 15 (e.g., as previously described with reference to FIG. 1).

The memory 26 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 26 can be implemented to securely store the passwords and corresponding email addresses of users. The passwords and corresponding email messages can accessed by, for example, technical support persons, a webmaster, or other administrative or management persons and/or devices.

Additionally, the memory 26 can be used to store any type of instructions associated with algorithms, processes, or operations for controlling the general functions and operations of the central server 1 in accordance with the different aspects and embodiments described in the present disclosure.

The controller 28 controls the general operations of the central server 1 and includes, but is not limited to, a CPU, a hardware microprocessor, a multi-core processor, a single core processor, a FPGA, a microcontroller, an ASIC, a DSP, or other similar processing device capable of executing any type of instructions, algorithms, or software for controlling the operation and performing the functions of the modem/gateway device 2. Communication between the components (e.g., 23-26 and 28) of the central server 1 is established using the internal bus 29.

The CS email server 8 may be any type of server or computer implemented as a network server or network computer that is capable of running MTA software in accordance with SMTP to enable receiving, transmitting and storing email messages. The CS email server 8 may also provide various shared resources to other devices connected to the network via the Internet 6. As shown in FIG. 2, the CS email server 8 includes a power supply 30, a user interface 31, a network interface 32, a memory 33, and a controller 35.

The power supply 30 supplies power to the internal components of the CS email server 8 through the internal bus 36. The power supply 30 can be a self-contained power source such as a battery pack with an interface to be powered through an electrical charger connected to an outlet (e.g., either directly or by way of another device). The power supply 30 can also include a rechargeable battery that can be detached allowing for replacement such as a NiCd, a NiMH, a Li-ion, or a Li-pol battery.

The user interface 31 includes, but is not limited to, push buttons, a keyboard, a keypad, an LCD, a TFT, an LED, an HD or other similar display device including a display device having touch screen capabilities so as to allow interaction between a user and the CS email server 8. The network interface 32 includes various network cards, and circuitry implemented in software and/or hardware to enable communications using the wireless protocols of connection 14 (e.g., as previously described with reference to FIG. 1).

The memory 33 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 33 can be implemented to store email messages 34 and related data. The email messages 34 and related data can accessed by, for example, technical support persons, a webmaster, or other administrative or management persons and/or devices.

Additionally, the memory 33 can be used to store any type of instructions associated with algorithms, processes, or operations for receiving, transmitting, and storing email messages, for example, MTA software, as well as for controlling the general functions and operations of the CS email server 8 in accordance with the different aspects and embodiments described in the present disclosure. The controller 35 controls the general operations of the CS email server 8 and includes, but is not limited to, a CPU, a hardware microprocessor, a multi-core processor, a single core processor, a FPGA, a microcontroller, an ASIC, a DSP, or other similar processing device capable of executing any type of instructions, algorithms, or software for controlling the operation and performing the functions of the CS email server 8. Communication between the components (e.g., 30-33 and 35) of the CS email server 8 is established using the internal bus 36.

The CD email server 7 may be any type of server or computer implemented as a network server or network computer that is capable of running MTA software in accordance with SMTP to enable receiving, transmitting and storing email messages. The CS email server 7 may also provide various shared resources to other computing devices connected to the network via the Internet 6. As shown in FIG. 2, the CD email server 7 includes a power supply 37, a user interface 38, a network interface 39, a memory 40, and a controller 42.

The power supply 37 supplies power to the internal components of the CD email server 7 through the internal bus 43. The power supply 37 can be a self-contained power source such as a battery pack with an interface to be powered through an electrical charger connected to an outlet (e.g., either directly or by way of another device). The power supply 37 can also include a rechargeable battery that can be detached allowing for replacement such as a NiCd, a NiMH, a Li-ion, or a Li-pol battery.

The user interface 38 includes, but is not limited to, push buttons, a keyboard, a keypad, an LCD, a TFT, an LED, an HD or other similar display device including a display device having touch screen capabilities so as to allow interaction between a user and the CD email server 7. The network interface 39 includes various network cards, and circuitry implemented in software and/or hardware to enable communications using the wireless protocols of connection 14 (e.g., as previously described with reference to FIG. 1).

The memory 40 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 40 can be implemented to store at least email messages 41 and related data. The email messages 41 and related data can accessed by, for example, technical support persons, a webmaster, or other administrative or management persons and/or devices.

Additionally, the memory 40 can be used to store any type of instructions associated with algorithms, processes, or operations for receiving, transmitting, and storing email messages, for example, MTA software, as well as for controlling the general functions and operations of the CD email server 7 in accordance with the different aspects and embodiments described in the present disclosure. The controller 42 controls the general operations of the CD email server 7 and includes, but is not limited to, a CPU, a hardware microprocessor, a multi-core processor, a single core processor, a FPGA, a microcontroller, an ASIC, a DSP, or other similar processing device capable of executing any type of instructions, algorithms, or software for controlling the operation and performing the functions of the CD email server 7. Communication between the components (e.g., 37-40 and 42) of the CD email server 7 is established using the internal bus 43.

The client device 4 can be, for example, a hand-held computing device, a personal computer, an electronic tablet, a smart phone, smart speakers, an IoT device, an iControl device, or other similar wireless hand-held consumer electronic device capable of executing and displaying the content received through, for example, the modem/gateway device 2. As shown in FIG. 2, the client device 4 includes a power supply 45, user interface 44, network interface 46, a memory 50, a camera 49, and a controller 47.

The power supply 45 supplies power to the internal components of the client device 4 through an internal bus 48. The power supply 45 can be a self-contained power source such as a battery pack with an interface to be powered through an electrical charger connected to an outlet (e.g., either directly or by way of another device). The power supply 45 can also include a rechargeable battery that can be detached allowing for replacement such as NiCd, a NiMH, a Li-ion, or a Li-pol battery.

The user interface 44 includes, but is not limited to, push buttons, a keyboard, a keypad, an LCD, a TFT, an LED, an HD or other similar display device including a display device having touch screen capabilities so as to allow interaction between a user and the client device 4.

The network interface 46 includes various network cards, interfaces, and circuitry implemented in software and/or hardware to enable communications using the wireless protocols of connections 9 and 14 (e.g., as previously described with reference to FIG. 1).

The memory 50 includes a single memory or one or more memories or memory locations that include, but are not limited to a RAM, a DRAM, a memory buffer, a hard drive, a database, an EPROM, an EEPROM, a ROM, a flash memory, logic blocks of a FPGA, hard disk or any other various layers of memory hierarchy. The memory 50 can be used to store an email application 51 and any type of instructions 51 associated with algorithms, processes, or operations for controlling the general functions and operations of the client device 4 and for retrieving a password for accessing a wireless network as described herein. The camera 49 can be a standard camera of a camera phone that is able to capture photographs and record video.

The controller 47 controls the general operations of the client device 4 and includes, but is not limited to, a CPU, a hardware microprocessor, a multi-core processor, a single core processor, a FPGA, a microcontroller, an ASIC, a DSP, or other similar processing device capable of executing any type of instructions, algorithms, or software for controlling the operation and performing the functions of the client device 4. Communication between the components (e.g., 44-47, 49 and 50) of the client device 4 is established using the internal bus 48.

Figure 3:
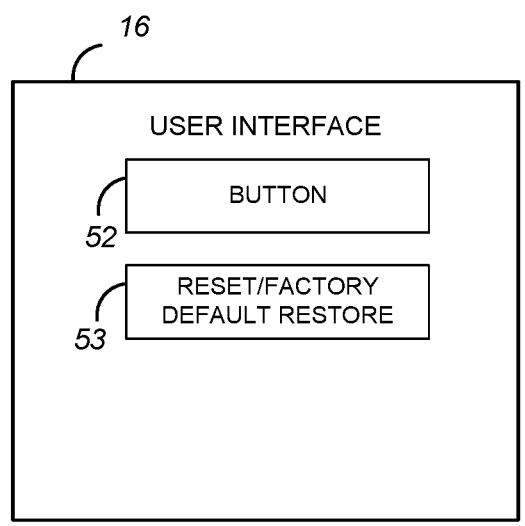
FIG. 3 is a schematic diagram illustrating an exemplary user interface according to an embodiment of the present disclosure.

FIG. 3 is a schematic diagram illustrating an exemplary user interface according to an embodiment of the present disclosure. As shown in FIG. 3, the user interface 16 of the modem/gateway device 2 may include physical buttons 52, 53. As shown in FIG. 3, the buttons include button 52 and a reset/factory default restore button 53. It is contemplated by the present disclosure that the button 52 may be related to controlling various functions of the modem/gateway device 2 such as, but not limited to, Wi-Fi, WPS, or any other Wi-Fi related function. The reset/factory default restore button 53 may be pressed to restore factory settings of the modem/gateway device 2.

In an embodiment of the present disclosure, the button 52 can be used to activate a function of retrieving a password for a wireless network. For example, the button 52 can be pressed using a predetermined sequence to activate the password retrieval operation. The predetermined pressing sequence to activate the function of retrieving the password can be initially set or changed to be virtually any pressing sequence. It is contemplated by the present disclosure that the button 52 may have more than one function and the pressing sequence to activate the password retrieval operation can be different from the pressing sequence used to active the primary or other functions of the button 52 (e.g., Wi-Fi, WPS, or any other Wi-Fi related function).

As one example of the predetermined pressing sequence, the button 52 can be pressed repeatedly in quick succession (e.g., twice, three times, four times, etc.) or pressed continuously for a predetermined period (e.g., may include, but is not limited to, between 2 to 30 seconds). It is contemplated by the present disclosure that the predetermined period may be set to any duration and the button 52 may be pressed in any manner to implement the Wi-Fi password retrieval operation. The details of retrieving a password for a wireless network will be discussed in more detail with reference to FIG. 4.

As shown in FIG. 3, the exemplary user interface is located on or in the modem/gateway device 2. However, it is contemplated by the present disclosure that a user interface for implementing the password retrieval operation could be located in or on a wireless extender 3 or other network device, which may include a button that can be operated to request activation of the password retrieval operation. It is contemplated by the present disclosure that any button could be used on a modem/gateway device 2, a wireless extender 3, or other network device for activating the password retrieval operation.

It is further contemplated by the present disclosure that the modem/gateway device 2 or the wireless extender 3 could implement the use of a graphical user interface (GUI) in which a user may opt to activate the password retrieval operation. On the other hand, a user could use the mobile application 51 on the client device 4 for requesting activation of the password retrieval operation.

Figure 4:
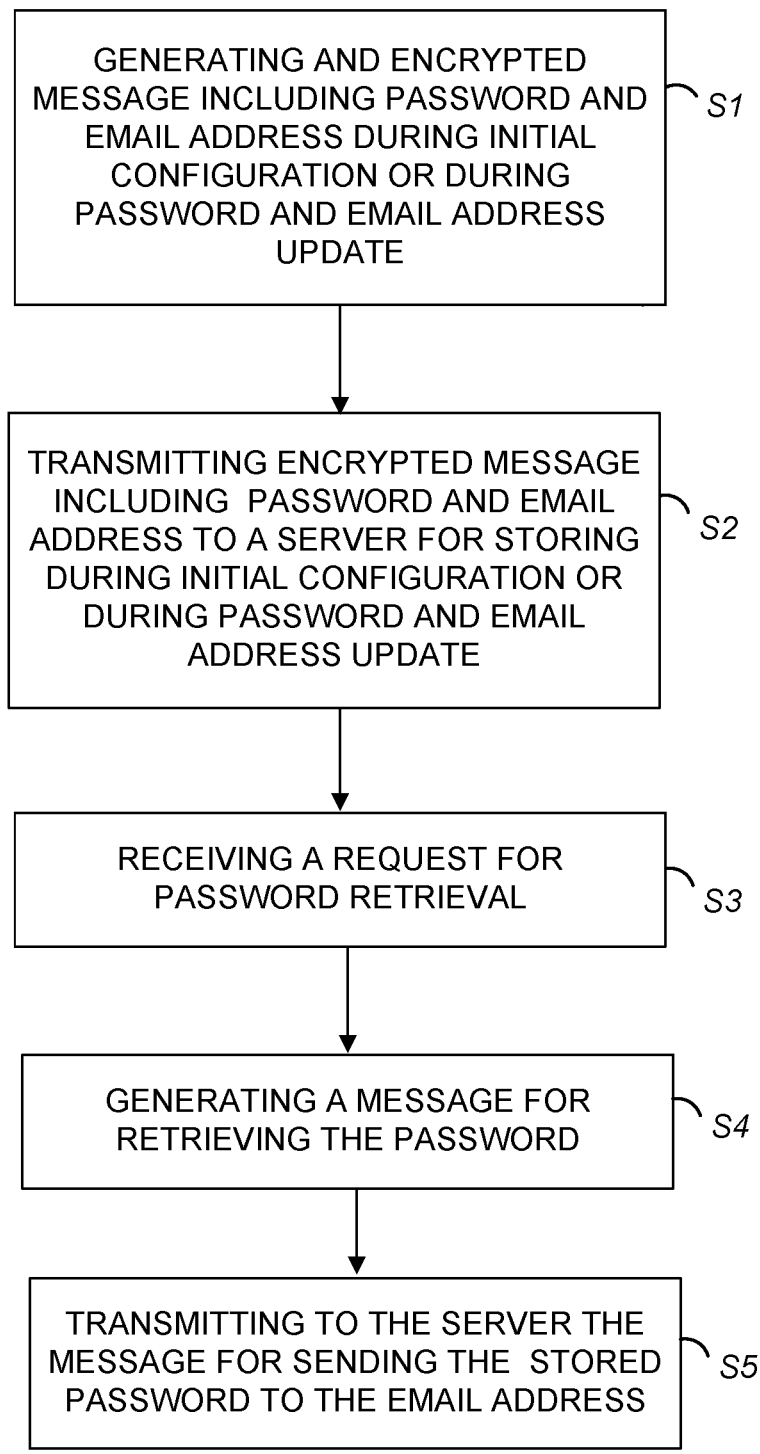
FIG. 4 is an exemplary method and algorithm for retrieving a password for accessing a wireless network according to an embodiment of the present disclosure.

FIG. 4 is an exemplary method and algorithm for retrieving a password for accessing a wireless network in accordance with an embodiment of the present disclosure. FIG. 4 illustrates exemplary operations performed for storing a password and a corresponding email address, as well as operations performed when a user activates a password retrieval operation via the user interface 16 as shown in FIG. 3. The exemplary method and algorithm of FIG. 4 includes operations that may be performed by the software 20 executed by the controller 21 of the modem/controller device 2.

In step S1, during an initial configuration of a wireless network, a user of the modem/gateway device 2 can configure a password for the wireless network along with a corresponding email address. For example, the software 20 executed by the controller 21 of the modem/gateway device 2 may cause the user interface 16 to display a message prompting the user to enter a password for the wireless network and a corresponding email address. After the password and corresponding email address are entered, the software 20 executed by the controller 21 generates a message including the password and corresponding email address, and encrypts the message. The encrypted message is generated so the password and email address are linked together and protected.

In addition to the initial configuration of a wireless network, it is contemplated by the present disclosure that a user of the modem/gateway device 2 can also configure an updated password for the wireless network and/or a corresponding updated email address using a similar method noted above. That is, an encrypted message can be generated by the modem/gateway device 2 including an updated password and/or a corresponding updated email address. An updated password and/or email address may be required, for example, when the password is forgotten and/or the email address changes.

Next, in step S2, the modem/gateway device 2 transmits the encrypted message to the central server 1 for storage using network interface 17 and via connection 13, the Internet 6, and connection 14. A similar procedure would be used by the modem/gateway device 2 when transmitting an encrypted message including an updated password and/or a corresponding updated email address.

The central server 1 decrypts the received message and stores the password along with the corresponding email address in the memory 26 of the central server 1. For the alternate location of the central server 1 (e.g., as indicated by the dashed or dotted lines in FIG. 1), the modem/gateway device 2 transmits the message to the central server 1 using network interface 17 and connection 15.

It is also contemplated by the present disclosure that a message including the updated password and/or corresponding updated email address would be handled and stored in a similar fashion by the central server 1. That is, the central server 1 would decrypt the received message and store the updated password along with the corresponding email address in the memory 26 of the central server 1. The updated password and/or corresponding updated email address may replace the initial password and/or corresponding initial email address in the memory 26 of the central server 1. Alternatively, the central server 1 may store in the memory 26 both the initial and updated passwords as well as the initial and updated email addresses.

For example, in embodiments of the present disclosure, the controller 21 may receive information that the user has changed the password or the email address rendering the previously saved information out of date. In such a case, the controller 21 would generate, encrypt and transmit an updated email message. The central server 1 can then discard the previously stored email and store the new one in its place.

Next, in step S3, the software 20 executed by the controller of the modem/gateway device 2 causes the modem/gateway 2 to receive a request for a password retrieval operation via the user interface 16 of the modem/gateway device 2 (e.g., as shown in FIG. 3). For example, when activating the password retrieval operation, the user would press the physical button 52 using a predetermined sequence (e.g., as described with reference to FIG. 3).

In step S4, the software 20 executed by the controller 21 of the modem/gateway device 2 causes the modem/gateway device 2 to generate a message for retrieving the initial password stored in the central server 1. In step S5, the modem/gateway device 2 transmits the message to the central server 1 using the network interface 17 and the connection 13, Internet 6, and connection 14. The message may include an identifier (ID) or identifying information for uniquely identifying the source of the request. This ID can then be associated with the ID that was stored along with the password and email address in the central server 1. After receiving the message, the central server 1 retrieves the stored password, and transmits the password to the corresponding email address stored along with the password. The central server 1 uses the network interface 25 and connection 14 to transmit the retrieved password to the email address.

For example, the software 27 executed by the controller 28 of the central server 1 retrieves the stored password and corresponding email address from the memory 26, generates an email message that includes the password, and transmit the email message to the CS email server 8 using network interface 25 and connection 14. The email message is addressed to the stored email address corresponding to the password.

After receiving the email message, the CS email server 8 may transmit the email message to the CD email server 7 using the network interface 32 and the connection 14. The CD email server 7 then transmits the email message to the client device 4 using the network interface 39 and connection 14 or otherwise makes the email message available for a user to access the wireless network.

The software 51 executed by the controller 47 of the client device 4 can facilitate allowing the user to access the email message and the retrieve the password from the email message. After the user requests access to the wireless network using the client device 4, the software 51 executed by the controller 47 causes the client device 4 to display a prompt for entering the password. The user may manually enter the password using the user interface 44 or the software 51 executed by the controller 47 of the client device 4 may cause the client device 4 to automatically enter the password to gain access to the wireless network.

Using the method and algorithm for retrieving a wireless network password allows a user to quickly, conveniently, and inexpensively retrieve a wireless network password that can be used to connect to or access a password protected wireless network. Moreover, client devices may connect to or be granted access to a password protected wireless network quickly, conveniently, and inexpensively when the password is misplaced or forgotten.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIG. 4. For example, the one or more memories stores software or algorithms with executable instructions and the one or more processors can execute a set of instructions of the software or algorithms in association with onboarding of wireless extenders in the wireless residential network.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

We claim:

1. Network equipment having a wireless network password retrieval function comprising:
   a user interface;
   a hardware processor; and
   a non-transitory memory configured to store one or more programs, the hardware processor executes the one or more programs to:
   generate a first message including a password for a wireless network and a corresponding email address;
   encrypt the first message including the password and the corresponding email address;
   transmit the encrypted first message including the password and the corresponding email address to a server for storage therein;
   receive a request for a password retrieval in response to an input from the user interface,
   generate a second message for retrieving the password, the password corresponding to the email address to which an email is to be sent by the server, and
   transmit the second message for retrieving the password to the server,
   wherein the transmitted second message for retrieving the password instructs a password retrieval operation by the server to transmit the password to the email address.

2. The network equipment according to claim 1, wherein the user interface includes a button and the request for the password retrieval is received in response to activating the button using a predetermined sequence.

3. The network equipment according to claim 2, wherein the predetermined sequence includes activating the button repeatedly in quick succession or activating the button continuously for a predetermined period of time.

4. The network equipment according to claim 3, wherein the button has a second function different from the password retrieval.

5. The network equipment according to claim 1, wherein the password is a Wi-Fi password for accessing the wireless network.

6. The network equipment according to claim 1, wherein the hardware processor further executes the one or more programs to:
   generate a third message including an updated password and a corresponding updated email address;
   encrypt the third message including the updated password and the corresponding updated email address; and
   transmit the encrypted third message including the updated password and the corresponding updated email address to the server for storage therein.

7. A method for implementing a password retrieval function comprising:
   generating, using network equipment, a first message including a password for a wireless network and a corresponding email address;
   encrypting, using the network equipment, the first message including the password and the corresponding email address;
   transmitting, using the network equipment, the encrypted first message including the password and the corresponding email address to a server; and
   storing, using the server, the password and the corresponding email address;
   receiving, using the network equipment, a request for a password retrieval in response to an input from a user interface of the network equipment;
   generating, using the network equipment, a second message for retrieving the password, the password corresponding to the email address to which an email is to be sent by the server; and
   transmitting the second message for retrieving the password over a network to the server,
   wherein the transmitted message for retrieving the password instructs a password retrieval operation by the server to transmit the password to the email address.

8. The method according to claim 7, wherein the request for the password retrieval is received by activating a button on the user interface of the network equipment a predetermined sequence.

9. The method according to claim 8, wherein the predetermined sequence comprises activating the button repeatedly in quick succession or activating the button continuously for a predetermined period of time.

10. The method according to claim 7, wherein the password is a Wi-Fi password for accessing the wireless network.

11. The method accordingly to claim 7, wherein the button has a second function different from the password retrieval.

12. The method according to claim 7, further comprising:
    generating, using the network equipment, a third message including an updated password and a corresponding updated email address;
    encrypting, using the network equipment, the third message including the updated password and the corresponding updated email address;
    transmitting, using the network equipment, the encrypted third message including the updated password and the corresponding updated email address to the server; and
    storing, using the server, the updated password and the corresponding updated email address.

13. A non-transitory computer-readable recording medium in network equipment for implementing a password retrieval function, the non-transitory computer-readable recording medium storing one or more programs which when executed by a hardware processor performs steps comprising:
    generating a first message including a password for a wireless network and a corresponding email address;
    encrypting the first message including the password and the corresponding email address;
    transmitting the encrypted first message including the password and the corresponding email address to a server for storage therein;
    receiving a request for a password retrieval in response to an input from a user interface of the network equipment;
    generating a second message for retrieving the password, the password corresponding to the email address to which an email is to be sent by the server; and
    transmitting the second message for retrieving the password over a network to the server,
    wherein the transmitted message for retrieving the password instructs a password retrieval operation by the server to transmit the password to the email address.

14. The non-transitory computer-readable recording medium according to claim 13, wherein the request for the password retrieval is received by activating a button on the user interface of the network equipment using a predetermined sequence.

15. The non-transitory computer-readable recording medium according to claim 13, wherein the predetermined sequence comprises activating the button repeatedly in quick succession or activating the button continuously for a predetermined period of time.

16. The non-transitory computer-readable recording medium according to claim 13, wherein the password is a Wi-Fi password for accessing the wireless network.

17. The non-transitory computer-readable recording medium according to claim 13, wherein the one or more programs when executed by the hardware processor perform steps further comprising:
   generating a third message including an updated password and a corresponding updated email address;
   encrypting the third message including the updated password and the corresponding updated email address; and
   transmitting the encrypted third message including the updated password and the corresponding updated email address to the server for storage therein.

* * * * *